(12) United States Patent
Thompson

(10) Patent No.: US 12,146,744 B2
(45) Date of Patent: Nov. 19, 2024

(54) TERRAIN FOLLOWING ALTITUDE PROFILE GENERATION FOR ROUTE PLANNING

(71) Applicant: AURORA FLIGHT SCIENCES CORPORATION, Manassas, VA (US)

(72) Inventor: Alec Jeffrey Thompson, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 231 days.

(21) Appl. No.: 17/689,521

(22) Filed: Mar. 8, 2022

(65) Prior Publication Data

US 2022/0290992 A1 Sep. 15, 2022

Related U.S. Application Data

(60) Provisional application No. 63/160,206, filed on Mar. 12, 2021.

(51) Int. Cl.
*G01C 21/20* (2006.01)

(52) U.S. Cl.
CPC .................. *G01C 21/20* (2013.01)

(58) Field of Classification Search
CPC .... G01C 21/20; G01C 21/3826; G05D 1/101; G08G 5/0013; G08G 5/0021; G08G 5/0026; G08G 5/0039; G08G 5/006
See application file for complete search history.

(56) References Cited

U.S. PATENT DOCUMENTS

| | | |
|---|---|---|
| 2006/0235581 A1 | 10/2006 | Petillon |
| 2011/0184593 A1 | 7/2011 | Swope |
| 2016/0210863 A1* | 7/2016 | Kohn-Rich .......... G08G 5/0034 |
| 2018/0134400 A1 | 5/2018 | Knapp et al. |

OTHER PUBLICATIONS

The Concave Hull João Paulo Figueira Published in Towards Data Science Oct. 26, 2018 (Year: 2018).*
European Search Report for EPO Patent Application No. 22161488. 6, mailed Aug. 11, 2022, 9 pages.

* cited by examiner

*Primary Examiner* — Alan D Hutchinson
(74) *Attorney, Agent, or Firm* — Jordan IP Law, LLC

(57) ABSTRACT

Technology segments an input flight path into segments based on terrain data, identifies target altitude heights of endpoints of the segments based on the terrain data and a target cruise altitude of an aircraft, identifies local maximas associated with the segments that are arranged in an order along the input flight path, identifies one or more local maximas of the local maximas that represent a dip in altitude from a previous one or more of the local maximas, removes the one or more local maximas from the plurality of local maximas to generate a reduced list of local maximas, sets a plurality of waypoints as the endpoints and the local maximas in the reduced list of local maximas, generates a flight path based at least in part on the plurality of waypoints, and causes the flight path to be provided to the at aircraft.

20 Claims, 9 Drawing Sheets

TERRAIN FOLLOWING ALTITUDE PROFILE GENERATION FOR ROUTE PLANNING

CROSS-REFERENCE TO RELATED APPLICATIONS

The present application is a continuation of and claims the benefit of priority to U.S. Non-Provisional Patent Application No. 63/160,206 filed Mar. 12, 2021.

TECHNICAL FIELD

Examples generally relate to an aircraft flight path mapping process and implementation. More particularly, examples relate to an aircraft flight path generation process that maps an aircraft flight path prior to the aircraft traversing the aircraft flight path, and roughly follows the terrain at a target altitude (e.g., absolute altitude) above the terrain and/or a landscape while smoothing changes in true altitude of the aircraft.

BACKGROUND

Aircrafts follow a flight path over varying terrains. For example, a terrain can vary in elevation from sea level or other points. Consequently, an aircraft can have significant variations in altitude (e.g., mean seal level (MSL) altitude) to maintain a target altitude (e.g., a cruise altitude, above ground level (AGL) altitude) above a landscape. Furthermore, if structures (e.g., buildings) are formed on the terrain, the target altitude can be measured with respect to the structures to maintain a safe flying distance. Doing so however can be complicated and lead to significant variations in altitude, particularly in an urban environment. Thus, some implementations can lead to significant and rapid variability in AGL and/or MSL altitude of an aircraft over the duration of a flight path.

BRIEF DESCRIPTION OF THE DRAWINGS

The various advantages of the examples will become apparent to one skilled in the art by reading the following specification and appended claims, and by referencing the following drawings, in which:

DETAILED DESCRIPTION

Some examples relate to a flight path generation and implementation process that maintains a minimum AGL altitude of an aircraft while reducing the complexity of the generated altitude profile of the flight path. Some examples analyze various waypoints along flight paths to identify a flight path that minimizes and/or reduces variances in AGL altitude and/or MSL altitude to maintain a target altitude above a landscape. Doing so provides numerous enhancements. For example, if the aircraft is autonomous and is transporting passengers, variances in AGL and/or MSL altitude can cause discomfort and/or illness. Moreover, if the aircraft is transporting cargo, the cargo can become damaged if the variances in AGL and/or MSL altitude are significant. Moreover, changes in the AGL and/or MSL altitude needlessly consume resources (e.g., fuel) and can increase a flight path time and length.

Other conventional methods, apparatuses and systems fail to and/or are unable to implement reductions of variances in AGL and/or MSL altitude when generating a flight path, leading to the aforementioned problems. Thus, examples as described herein provide a technical flight path generation solution to the aforementioned technical problems. As will be described below in greater detail, examples described herein enable a computer system to operate as a special purpose computer system for generation of a flight path that maintains a minimum AGL and/or ASL altitude of an aircraft while reducing the complexity of the generated altitude profile.

Figure 1:
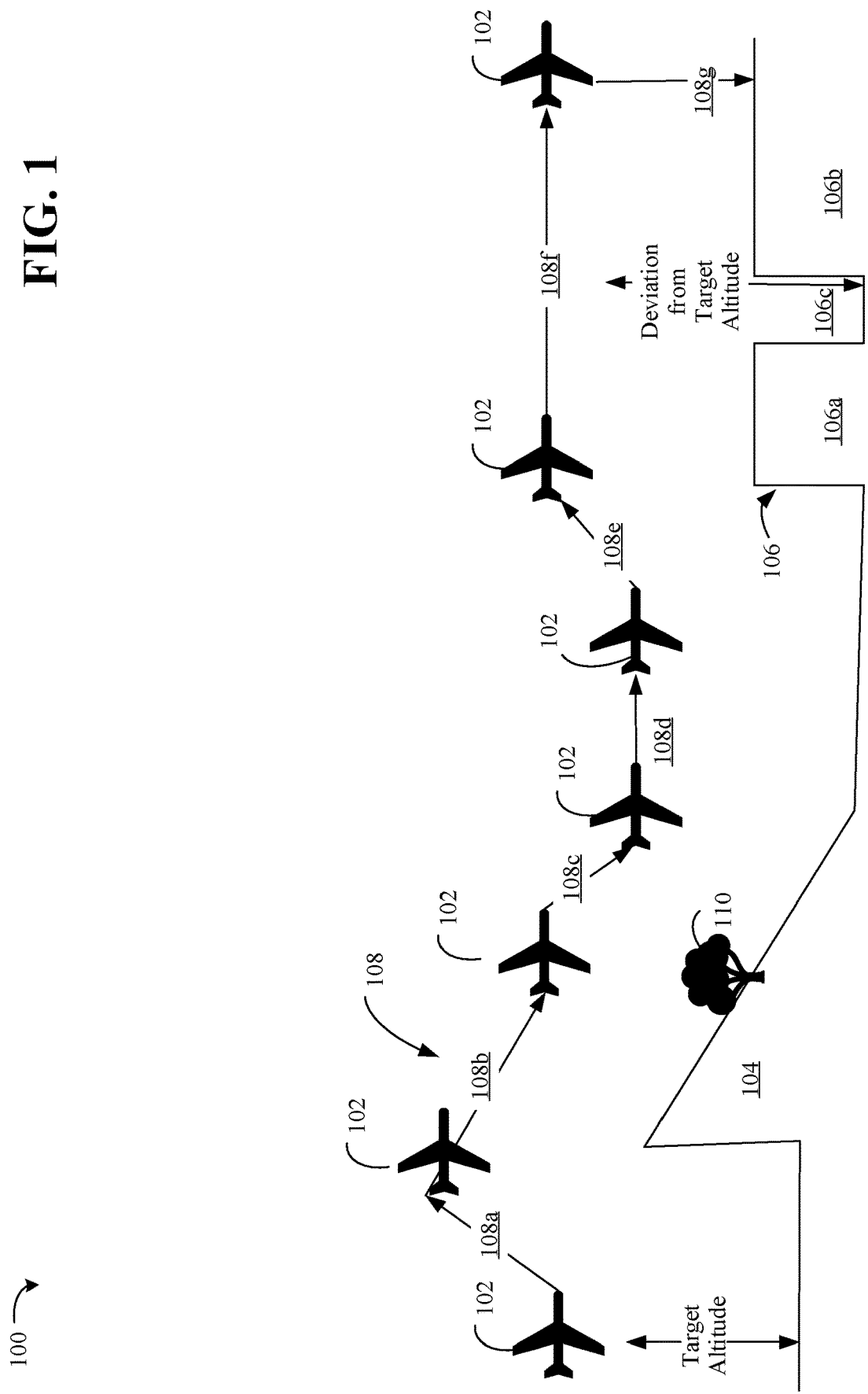
FIG. 1 is a process of an example of flight generation and implementation process according to an example.

Turning now to FIG. 1, a flight generation and implementation process 100 is illustrated. In process 100, a flight path 108 is a terrain-following altitude profile generation that provides an altitude profile for aircraft 102 along a series of waypoints that roughly follows an underlying terrain 104 and/or urban area 106 while smoothing AGL and/or MSL altitude adjustments through a selection of waypoints along the flight path 108. The waypoints are points between segments 108a-108g. Doing so alleviates the aforementioned considerations to enhance passenger comfort, safely transport cargo, reduce resources utilization and/or reduce travel time.

The flight path 108 is generated before the route is executed and based on a pre-existing database of maps and terrain profiles. Doing so permits a thorough generation of the flight path 108 with existing hardware and maps. An altitude profile of the aircraft 102 can be generated from existing latitude and longitude coordinates of the flight path 108, and undergoes several smoothing and pruning algorithms to reduce (e.g. minimize) the complexity of the flight path 108. Additionally, the process 100 is sufficiently extensible to allow the incorporation of non-terrain data (e.g., No Fly Zones (NFZs)) in the altitude profile of the flight path that must be bypassed and/or considered. The process 100 modifies an original input flight path to generate flight path 108 and maintain an association between each altitude profile segment of flight path 108 and a single waypoint, allowing for simple integration into altitude smoothing algorithms described herein.

As illustrated, the aircraft 102 follows the flight path 108. The flight path 108 roughly maintains a target altitude between the aircraft 102 and an underlying landscape which includes obstacles, natural features and manmade features. The flight path 108 bypasses and/or avoid areas that would cause substantial deviations in MSL altitude. For example, the aircraft 102 follows a first segment 108a of flight path 108 to increase the MSL altitude and maintain the target altitude between the aircraft 102 and the terrain 104. In detail, the terrain 104 includes an upward protrusion (e.g., a mountain, hill, etc.). Therefore, the aircraft 102 increases the MSL altitude. The aircraft 102 then descends along second segment 108b of flight path 108. The aircraft 102 is sensitive enough to maintain the target altitude above features (e.g., obstacles) on the terrain 104, such as forest 110 (e.g., to maintain the target altitude based on the landscape). Thereafter, the descent of the aircraft 102 is adjusted along third segment 108c of flight path 108 to increase an angle of descent of the aircraft 102.

Thereafter, the terrain 104 is substantially level so that the aircraft 102 maintains a level course along fourth segment 108d of the flight path 108. The aircraft 102 then approaches an urban area 106 comprising buildings 106a and 106b. Since the target altitude is considered with respect to the landscape, the aircraft 102 adjusts the MSL and/or AGL altitude upward along fifth segment 108e of the flight path 108 to maintain the target altitude between the building 106a and the aircraft 102. The aircraft 102 passes over a space 106c between buildings 106a, 106b along sixth segment 108f. As the aircraft 102 passes over the space 106c between the buildings 106a, 106b, the aircraft 102 bypasses adjusting the AGL altitude and/or MSL altitude to deviate from the target altitude and avoid a concave dip. Notably, since the flight path 108 above the space 106c is determined to span a short distance (e.g., below a predetermined threshold such as 20 feet), the flight path 108 does not adjust the AGL and/or MSL altitude to maintain the target altitude. The flight path 108 terminates with seventh segment 108g. The aircraft 102 executes a drop off of passengers and/or packages to building 106b, and/or lands on building 106b.

Thus, some examples generate the flight path 108 prior to the aircraft 102 traversing the flight path 108 or taking flight. In doing so, a more robust data set of maps and altitudes are accessed and analyzed to identify a suitable travel plan and flight path 108. Moreover, the flight path 108 is not reliant on sensors of the aircraft 102. For example, some other implementations generate flight paths based only on sensor data retrieved in-flight and on the fly. Doing so relies heavily on the efficiency and reach of the sensors, and therefore can fail to identify relevant landscape features. Moreover, some types of aircraft can be ill-equipped to generate such a flight path due to insufficient sensors and/or processing power. Thus, some examples generate the flight path 108 based on a robust data set and is applied to any aircraft that includes flight path following capabilities. Some embodiments may incorporate sensor data from the aircraft 102 to adjust the flight path 108 on the fly.

Furthermore, while waypoints are described between the segments 108a-108g, it will be understood that waypoints can also be positioned within segments 108a-108g to facilitate granular altitude changes. Moreover, the segments 108a-108g can vary in all three dimensions from each other.

Figure 2:
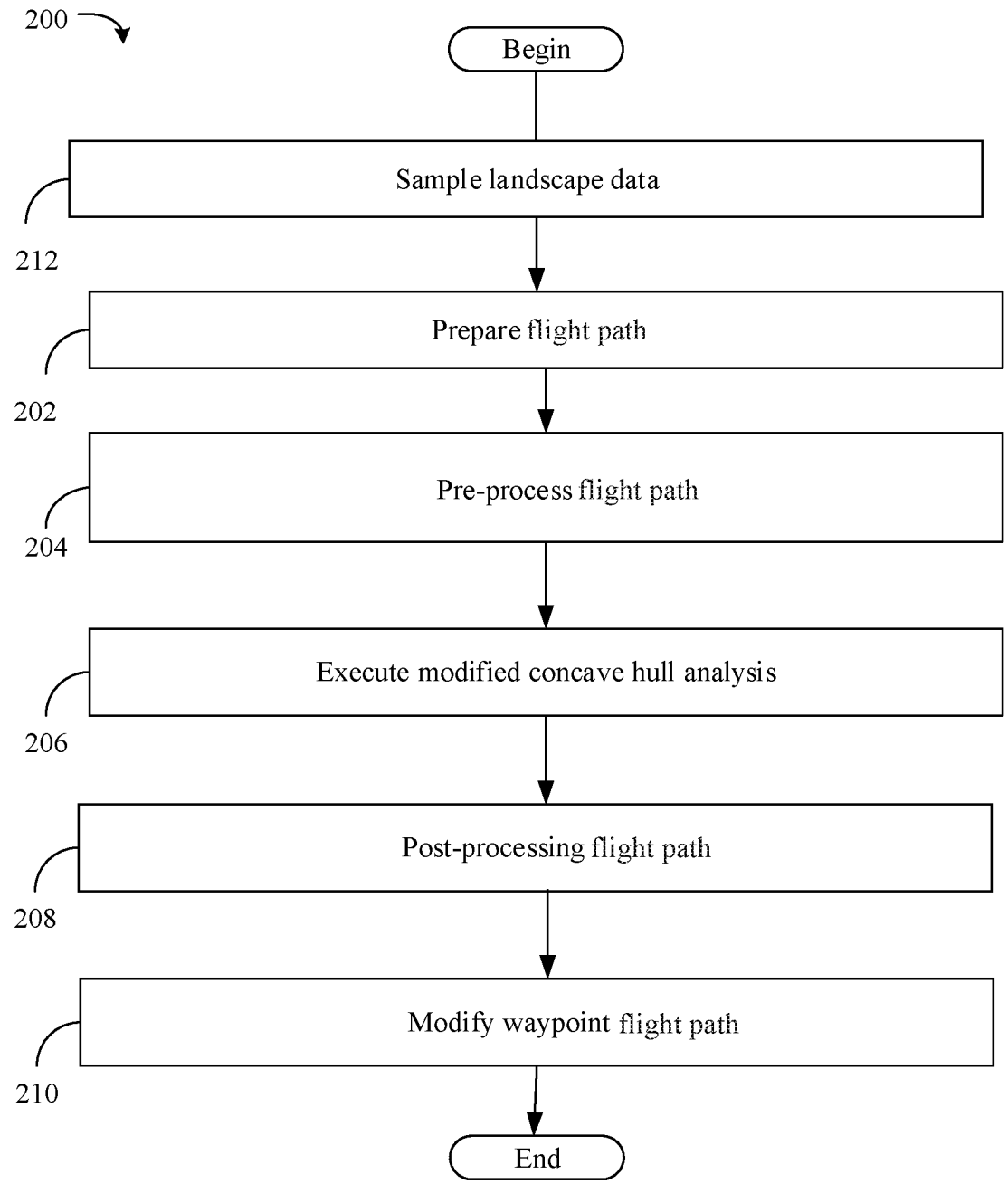
FIG. 2 is a flowchart of an example of a method of generating a flight path for an autonomous and/or semi-autonomous aircraft according to an example.

FIG. 2 illustrates a method 200 of generating a flight path for an autonomous and/or semi-autonomous aircraft. Method 200 can be generated prior to the aircraft following the flight path. The method 200 is generally implemented as part of process 100 (FIG. 1) already discussed. In an example, the method 200 is implemented in one or more modules as a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. When implemented, the method 200 enables a computer system to operate as a special purpose computer system for generation of a flight path that maintains a minimum AGL and/or ASL altitude of an aircraft while reducing the complexity of the generated altitude profile of the flight path.

Method 200 generates an altitude profile with a sampling of potential waypoints. Thereafter, method 200 populates an initial set of used points, and then executes multiple pruning, enhancement, and smoothing operations as will be described below. For example, method 200 generates an altitude profile of a flight path that includes a set of raw altitude profile waypoints. Each raw waypoint includes indicators (e.g., data fields) of whether the waypoint is currently set as part of the flight path (e.g., being used in the flight path, can also be referred to as a waypoint list), an original height of the waypoint, an adjusted height of the waypoint following smoothing, the associated original input waypoint, the associated discretized waypoint, and whether the waypoint is associated with the start or end of an original input segment. For a smoother iteration, each of the used waypoints includes pointers to a next and previously used waypoints.

For example, the waypoints can be arranged in the flight path in an order of traversal of the aircraft from start to finish. That is, the aircraft can move to a first waypoint. The first waypoint can point to a second waypoint, and so the aircraft can move to the second waypoint. The second waypoint can point to the first waypoint (e.g., as a previous waypoint) and a third waypoint (e.g., a next waypoint for traversal) and the aircraft can move to the third waypoint. This can continue until the aircraft reaches the destination through a series of waypoint. Thus, each waypoint can point to a next waypoint and a previous waypoint in the flight path.

Processing block 212 samples the landscape data (e.g., terrain data) underneath the input waypoint flight path. The input flight path is discretized into short segments. The terrain height and/or landscape height at the endpoints of the segments are sampled, and a target cruise altitude is added to the terrain height and/or landscape height. In some examples, processing block 212 includes the integration of other data sources, such as NFZs, into the flight path to exclude waypoints that conflict (e.g., fall within) the NFZs.

Illustrated processing block 202 prepares a flight path which can be referred to as a waypoint list. At this point, only the waypoints corresponding with the start and end of the segments are marked as used. Other waypoints between the start and end of the segments are maintained but marked as potential waypoints in the flight path (e.g., can be discarded later). Some examples include selecting a larger group of waypoints to be marked as used. This can be executed in two operations. The first operation marks all local maxima of the waypoints (e.g., each segment can include more than one local maxima) as used, and the second operation marks all points that represent an increase in slope with respect to the local maxima waypoint. For example, for each segment, a highest altitude (e.g., MSL altitude) waypoint can be marked as used, and each waypoint connected to the local maxima waypoint that has a higher altitude (e.g., MSL altitude) than other connected waypoints can be marked as used (e.g., indicating an increase in slope between the local maxima waypoint and used waypoint). Doing so marks all waypoints that can cause a drop below an original sampled height if removed from the flight path.

As an example, consider a set of adjacent sequential waypoints A, B, and C. The local maxima marking would include marking each waypoint B where the two adjacent waypoints A and C are at a lower altitude. The slope increase marking marks each waypoint C where the slope between waypoints B and C is more positive than the slope between the waypoints A and B when both slopes are greater than zero (potentially discarding waypoint A from further consideration), and marking each waypoint A and B as used when the slope between waypoints A and B is more positive than the slope between waypoints B and C (potentially discarding waypoint C from further consideration). This may continue iterating through each series of three waypoints in the flight path. In some embodiments, slope means a degree of slant.

Illustrated processing block 204 pre-processes the flight path to execute pruning and fixed point smoothing. Doing so reduces a number of points that can be processed in later operations of method 200, reducing latency of the method 200. Illustrated processing block 204 can include two operations. First, processing block 204 marks all waypoints that are within a threshold distance and represent a dip in altitude of the flight path.

For example, suppose that there are three waypoints (e.g., each being a local maxima) arranged in sequence. A first waypoint connects (e.g., points) to a second waypoint, and the second waypoint connects (e.g., points) to a third waypoint. Thus, if an aircraft were to traverse the three waypoints, the aircraft would travel through the first waypoint, the second waypoint and the third waypoint in that stated order. A dip is identified when the angle (e.g., a negative angle) from the first waypoint (e.g., previous point) to the second point (e.g., a pruneable candidate) is less than or equal to the angle (e.g., a positive angle) from the second point to the third point (e.g., next point), where the first, second and third points are in a sequential order along the flight path. If the dip is identified, the second waypoint can be pruned and removed from the flight path. Angle as used herein may be measured with respect to a horizontal line and a line connecting the points (e.g., waypoints) under consideration.

The second operation includes adjusting the altitude of the waypoints associated with the beginning and/or endpoints of segments, and can be referred to as fixed points. Such waypoints cannot be pruned without changing the flight path of the original flight path (e.g., route). Thus, if the waypoints meet the conditions for pruning (e.g., represents a dip) but are beginning or endpoints of a segment, the waypoints are instead smoothed such that they fall on the line between the two surrounding waypoints (e.g., waypoints connecting to the waypoint that is the beginning or the endpoint) through an adjustment in altitude.

Illustrated processing block 206 executes a modified concave hull analysis (e.g., ensures that relatively gradual but long durations in slope are tracked and result in changes in altitude, but sharp and small changes in slope are not tracked). The modified concave hull analysis does not necessarily have to be bounded by a specific shape, but instead creates a bounding edge along a set of points, with connections formed within a minimum and maximum distance as opposed to creating a bounding polygon which is what a full concave hull analysis typically does. Processing block 206 smooths and prunes the flight path. This algorithm iterates along the remaining waypoints, that are not pruned by prior operations, to search for a best waypoint to connect to within a minimum and maximum distance. At each waypoint, processing block 206 iterates through each following waypoint until either an unpruneable point associated with the end of a segment or a maximum horizontal distance, is reached.

For example, in some examples, processing block 206 identifies a first waypoint from the waypoints. Processing block 206 identifies a plurality of possible connection points from the waypoints to connect to the first waypoint, and identifies a slope between each possible connection point of the plurality of possible connection points and the first waypoint. Processing block 206 then identifies a maximum slope from the slopes that is associated with a first possible connection point of the plurality of possible connection points, eliminates one or more second connection points of the plurality of connection points from the waypoints, and bypasses elimination of the first possible connection point (e.g., selects the first possible connection point) from the waypoints.

For example, all waypoints before the minimum distance are only used to populate the maximum slope encountered, to prevent drops between the AGL. The first waypoint after the minimum distance is selected as the connection point, until a better (more positive slope) waypoint is found. Finding a fixed waypoint (e.g., a beginning point or endpoint of a segment) will terminate the search, as fixed points cannot be pruned as doing so would alter the flight path. If a fixed waypoint is found before the minimum distance, it will be used as the connection point. Once the search terminates, the connection point will be selected and set as one of the waypoints.

Only the waypoints between the previously selected point and the newly selected point (e.g., the selected first possible connection point) can be discarded. The other possible connection points between the newly selected point (e.g., the selected possible first connection point) and the maximum distance will be considered when selecting the next connection point from the newly selected point—either for slope considerations if closer than the minimum distance, or as potential connection points if further iterations are needed.

Thus, the connection waypoint will be either be the first fixed point (if found) if the first fixed point occurs within the minimum distance, or another waypoint associated with the most positive slope (e.g., the slope is measured between the another waypoint and the previous waypoint that is marked as used) that falls within an area between the minimum distance, and one of either of the maximum distance or the first fixed point found after the minimum distance inclusive. If this is also the maximum slope found during the search along the particular segment, then the connection is made, and all previously used waypoints between the current waypoint and the selected connection waypoint are marked as unused (e.g., eliminated). If there is a larger slope that occurred before the minimum distance, then the heights of the current waypoint and connection waypoint can be adjusted (e.g., if the connection waypoint is a fixed waypoint that cannot be pruned and represents a dip) to avoid a drop below the cruise altitude. For example, some examples execute one of the following three operations to adjust the heights. The first operation can adjust the height of only the current waypoint, the second operation can adjust the height of only the connection waypoint, and the third operation can split the height change between the current waypoint and the connection waypoint. Processing block 206 can select one of the three operations that has the smallest sum of altitude changes and change the heights based on the selected operation. Once the height modification is complete, the points are connected, and all used points between them are marked unused.

Illustrated processing block 208 executes post-processing of the flight path. Processing block 208 executes three post-processing operations. The first and third operations include point pruning and fixed point smoothing described above and similar to as described with respect to illustrated processing block 204. The second operation applies climb angle limitations to the altitude profile, to ensure that the altitude profile of the flight path can be tracked by the altitude smoothing algorithm and specifically the aircraft. Each waypoint in the flight path is iterated over, from highest to lowest. Processing block 208 can check for each connected waypoint, the climb angle from the connected waypoint to a previous waypoint in the flight path connecting to the connected waypoint, and the climb angle from a next waypoint in the flight path connected to the connected waypoint. If either of the climb angles exceed the maximum or maximum climb angles, the associated waypoint altitudes are adjusted to alleviate the climb angles. For example, the climb angles can be compared to one or more thresholds, where the one or more thresholds are one or more maximum climb angles (or descent angles) specific to the aircraft.

Illustrated processing block 210 modifies the waypoint flight path. For example, the waypoint flight path can be modified to align with used points. In some examples, processing block 210 iterates along the used flight path points (e.g., the remaining waypoints that have not been pruned and are selected for use), and connects the start of the associated discretized waypoint with the start of the next points discretized waypoint. Doing so breaks the waypoint flight path to line up with the points in the flight path.

Figure 3:
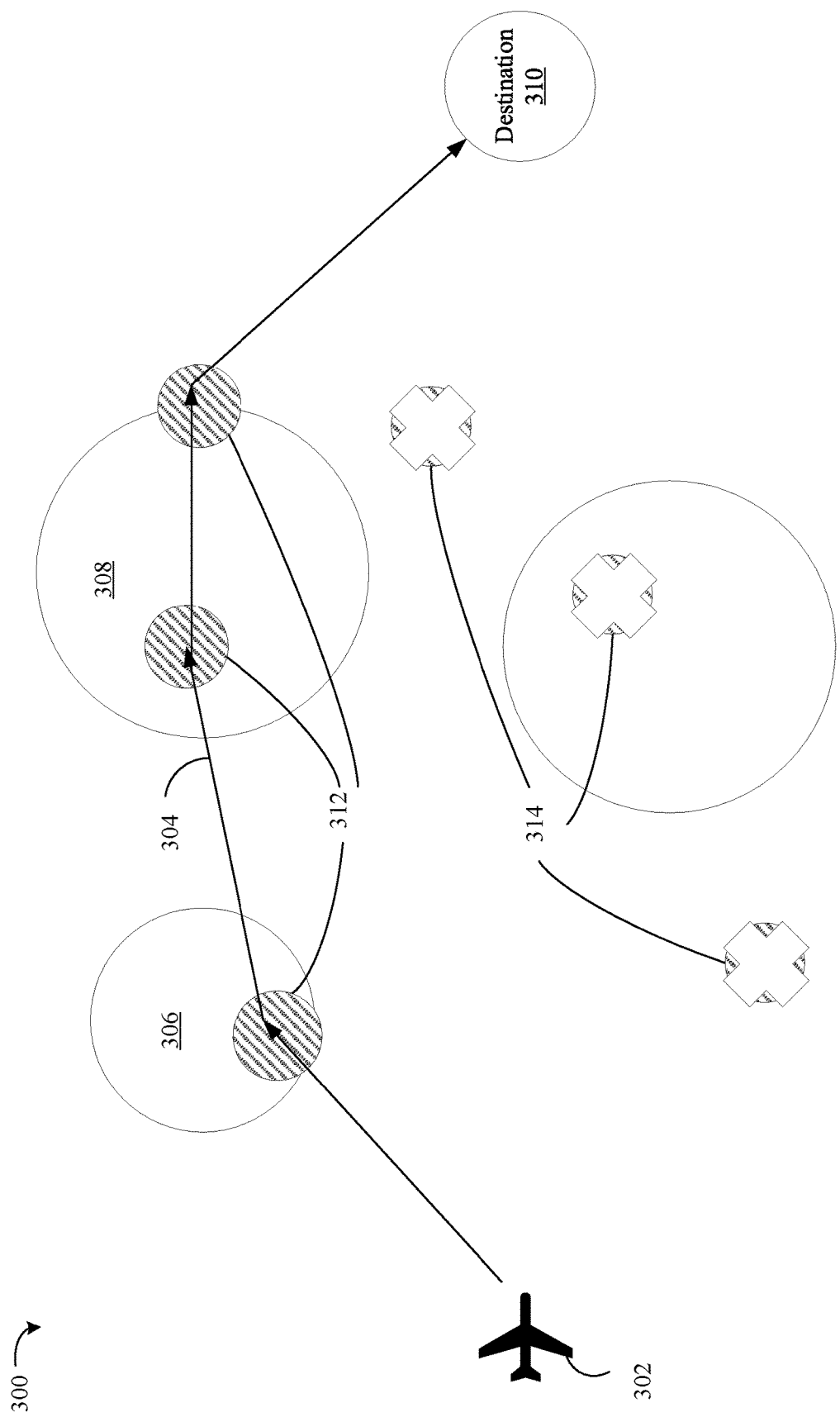
FIG. 3 is an architecture of an example of controlling a flight path according to an example.

FIG. 3 illustrates an architecture 300 for controlling a flight path 304 of an aircraft 302. The architecture 300 can be used in conjunction with process 100 (FIG. 1) and method 200 (FIG. 2), already discussed. In this example, the flight path 304 includes a plurality of way points 312 that are above mountains 306, 308. The excluded waypoints 314 are excluded from the flight path 304. The aircraft 302 traverses the flight path 304 to reach destination 310.

Figure 4:
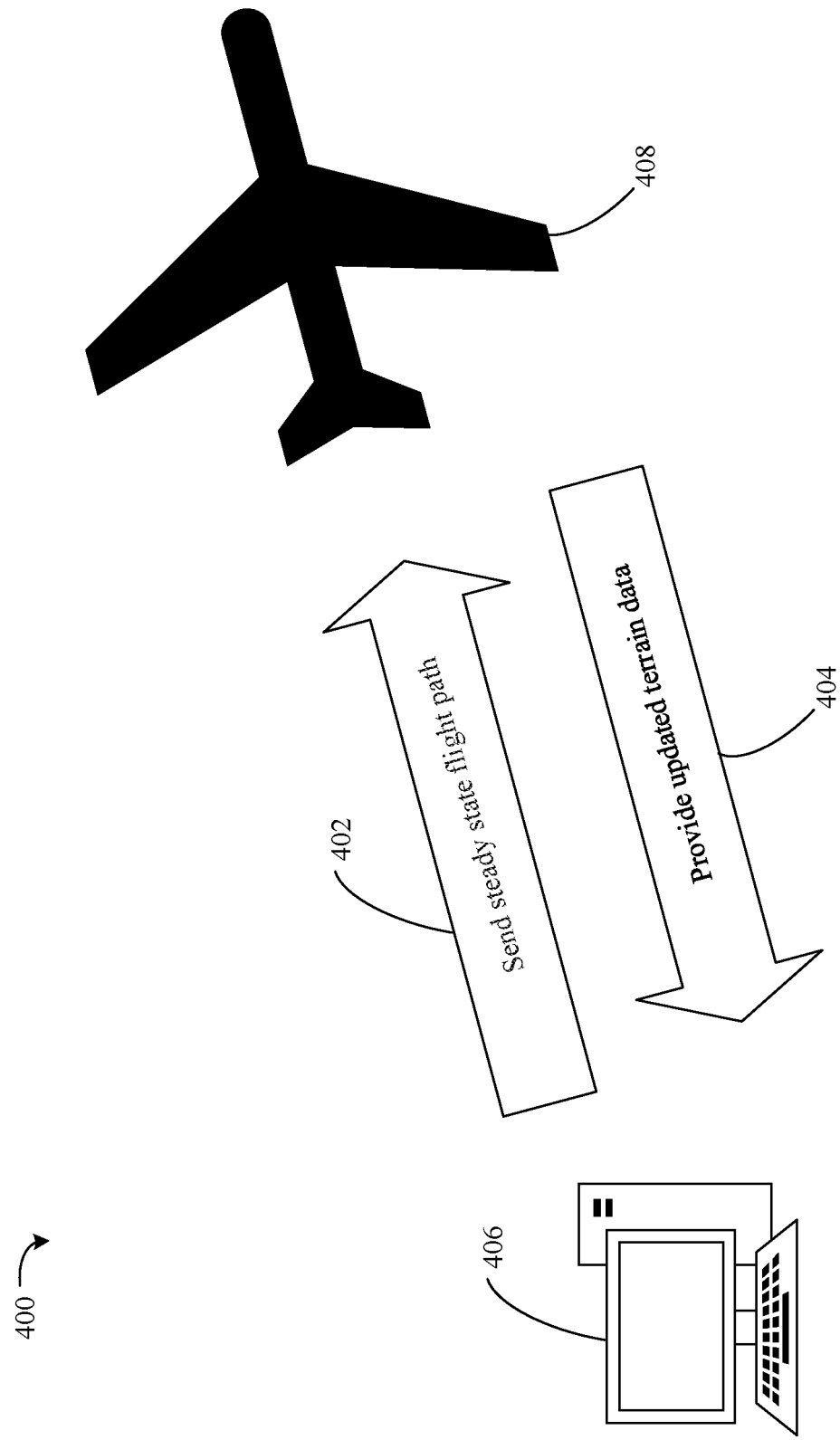
FIG. 4 is an architecture of an example of flight path generation according to an example.

FIG. 4 illustrates an architecture 400 for flight path generation. In detail, a computing device 406 generates a flight path to achieve a steady state altitude. The architecture 400 can be used in conjunction with process 100 (FIG. 1), method 200 (FIG. 2), and architecture 300 (FIG. 3) already discussed. The computing device 406 sends the steady state (e.g., altitude steady) flight path 402 to aircraft 408 that follows the flight path. The aircraft 408 can provide updated terrain data 404 to the computing device 406 so that the computing device 406 can update maps.

Figure 5A:
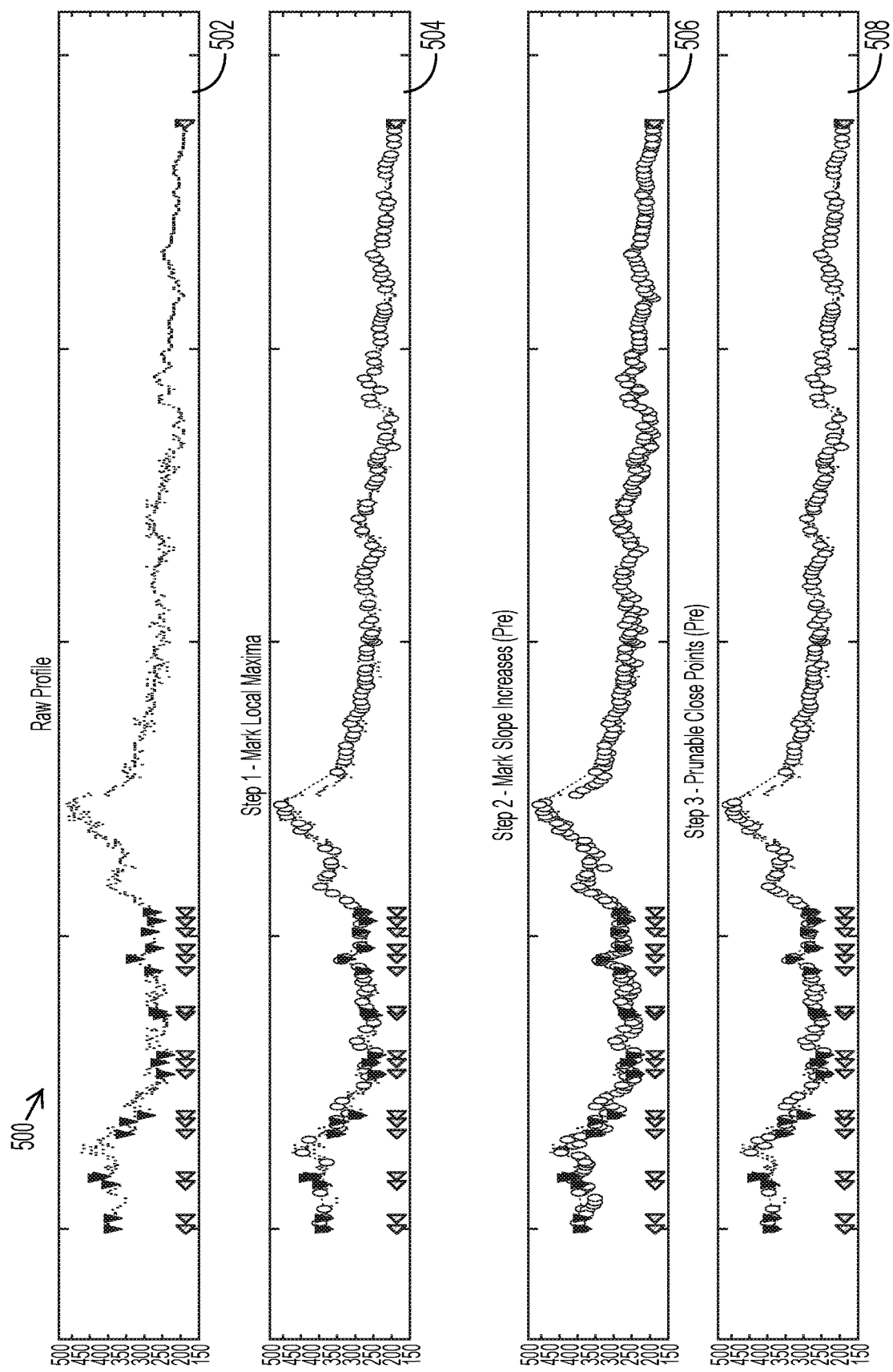
FIGS. 5A, 5B, and 5C are various mappings of flight paths according to an example.
Figure 5B:
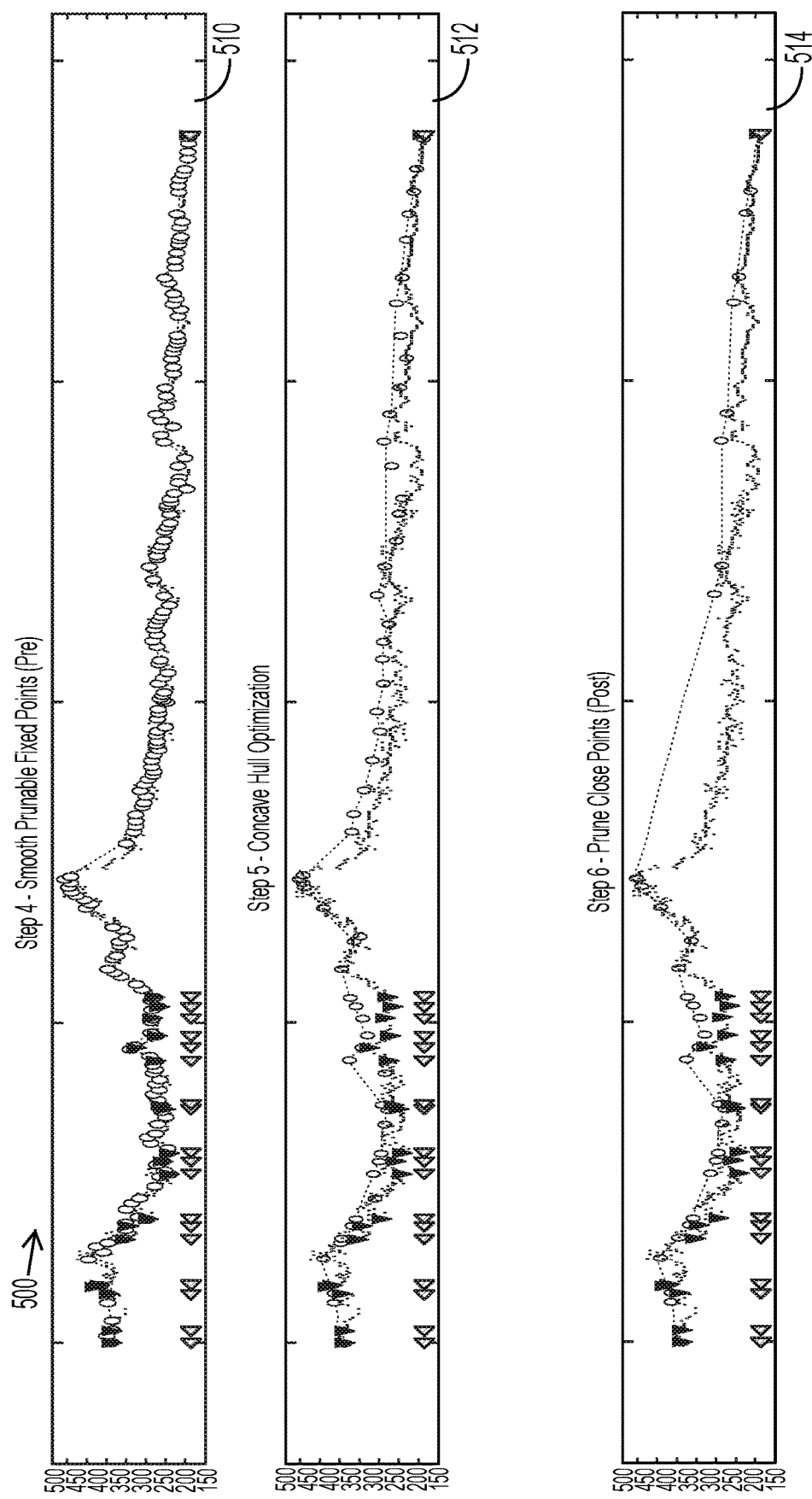
Figure 5C:
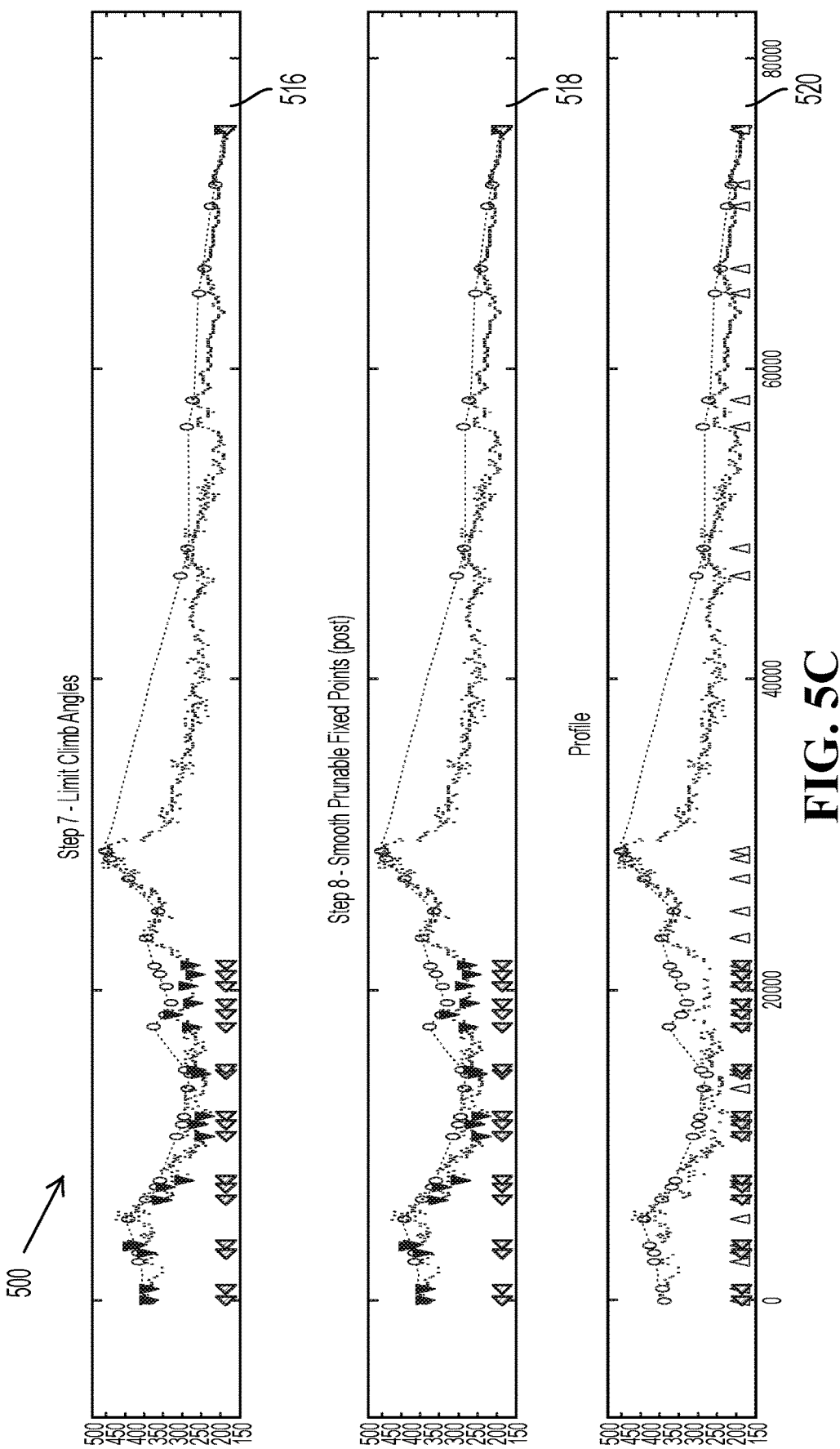

FIGS. 5A, 5B and 5C illustrate graphs 500 that are modified according to examples to determine a flight path. The graphs 500 can be used in conjunction with process 100 (FIG. 1), method 200 (FIG. 2), architecture 300 (FIG. 3) and/or architecture 400 (FIG. 4) already discussed. Raw flight path 502 can be initially generated (e.g., as described with respect to processing block 212 of FIG. 2).

As shown in FIG. 5A, raw flight path 502 can then be modified to mark local maxima 504 (e.g., as described with respect to processing block 202 of FIG. 2). The mark local maxima 504 can be modified to mark slop increases 506 (e.g., as described with respect to processing block 202 of FIG. 2).

The slope increases 506 are then pruned to generate pruned close points 508 (e.g., as described with respect to processing block 204 of FIG. 2). The pruned close points 508 can be smoothed to generate smooth prunable fixed points 510 (e.g., as described with respect to processing block 204 of FIG. 2).

As shown in FIG. 5B, a modified concave hull analysis can be executed on the smooth prunable fixed points 510 to generate a concave hull enhanced structure 512 (e.g., as described with respect to processing block 208 of FIG. 2). The structure 512 can be pruned to generate pruned close points 514 (e.g., as described with respect to processing block 208 of FIG. 2). The pruned close points 514 can be modified to generate limited climb angles 516 (e.g., as described with respect to processing block 208 of FIG. 2).

As shown in FIG. 5C, the limited climb angles 516 can be smoothed into prunable fixed point structure 518 (e.g., as described with respect to processing block 210 of FIG. 2). The structure 518 can be modified into final flight path 520.

Figure 6:
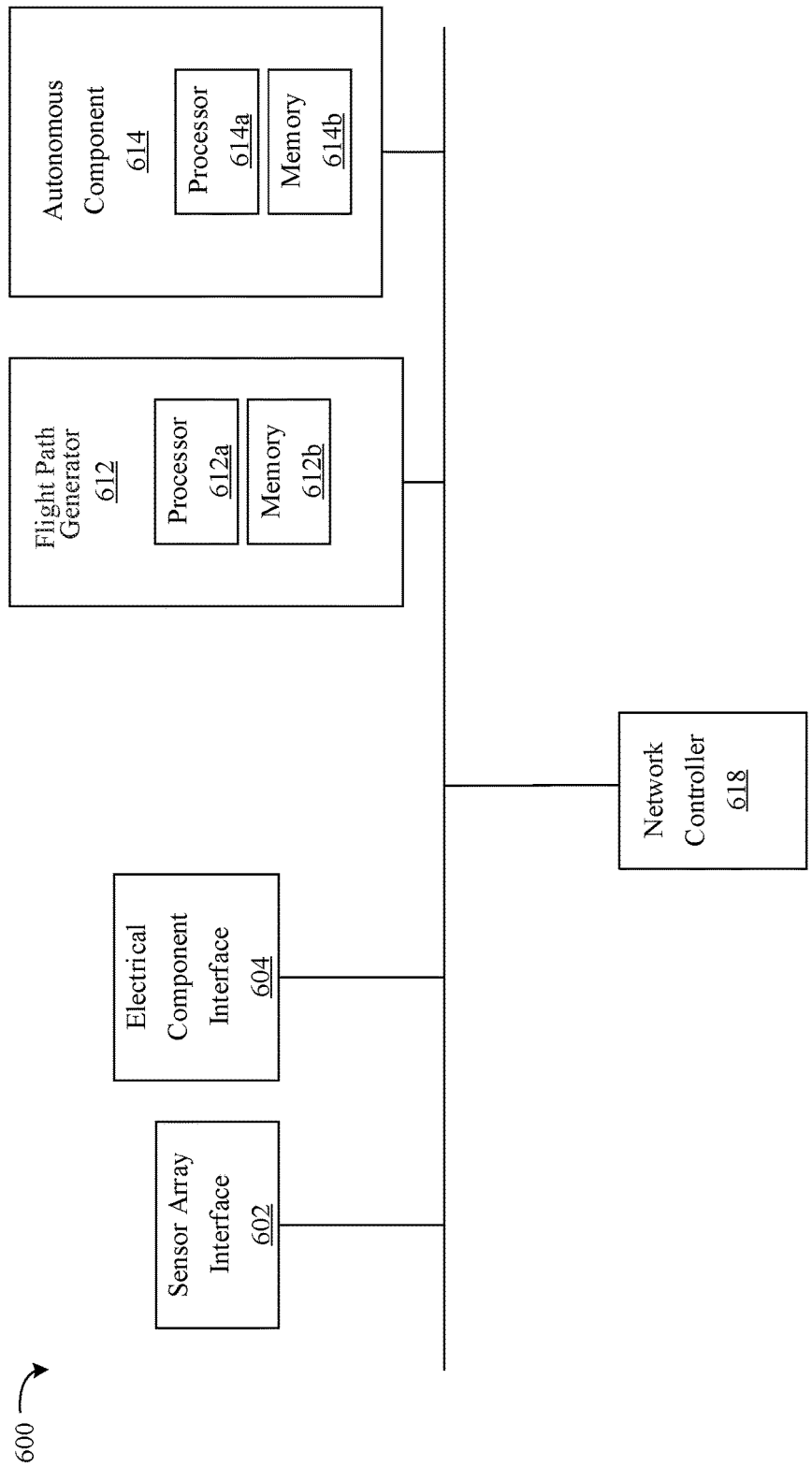
FIG. 6 is a block diagram of an example of an aircraft and flight path generation architecture according to an example.

FIG. 6 shows a more detailed example of a flight path generation and implementation architecture 600. The architecture 600 implements aspects of any of the examples herein, and can be used in conjunction with process 100 (FIG. 1), method 200 (FIG. 2), architecture 300 (FIG. 3), architecture 400 (FIG. 4) and/or graphs 500 (FIGS. 5A, 5B, and 5C) already discussed, already discussed. When implementing the aspects described above, the architecture 600 operates as a special purpose computer system for generation of a flight path that maintains a minimum AGL and/or ASL altitude of an aircraft while reducing the complexity of the generated flight path. The architecture 600 includes a sensor array interface 602 that retrieves sensor data for the architecture 600. The sensor array interface 602 interacts with various sensors of an aircraft to identify measurements of various conditions (e.g., humidity, altitude, velocity, acceleration, trajectory, etc.). The architecture 600 includes an electrical component interface 604 that controls electrical sensors of the airplane to modify parameters of the aircraft and/or provide updates of the electrical components (e.g., operating conditions) to implement a flight path.

The architecture 600 further includes network controller 618. The network controller 618 can establish a connection (e.g., an internet connection, radio connection, etc.) with a ground component for communications. In some examples, the ground component transmits a generated flight path to the architecture 600 to modify one or more parameters of the architecture 600 and control a flight path.

In some examples, the architecture 600 includes a flight path generator 612 to generate and/or modify the flight path. The flight path generator 612 includes a processor 612a (e.g., embedded controller, central processing unit/CPU) and a memory 612b (e.g., non-volatile memory/NVM and/or volatile memory) containing a set of instructions, which when executed by the processor 612a, implements any of the aspects as described herein to generate a flight path.

Additionally, an autonomous component 614 can follow a generated flight path. The autonomous component 614 includes a processor 614a (e.g., embedded controller, central processing unit/CPU) and a memory 614b (e.g., non-volatile memory/NVM and/or volatile memory) containing a set of instructions, which when executed by the processor 614a, implements any of the aspects as described herein.

Thus, technology described herein supports an enhanced method of aircraft flight path generation, and implementation thereof. Doing so reduces time of travel, reduces resource usage and enhances transportation of both products and passengers.

Figure 7:
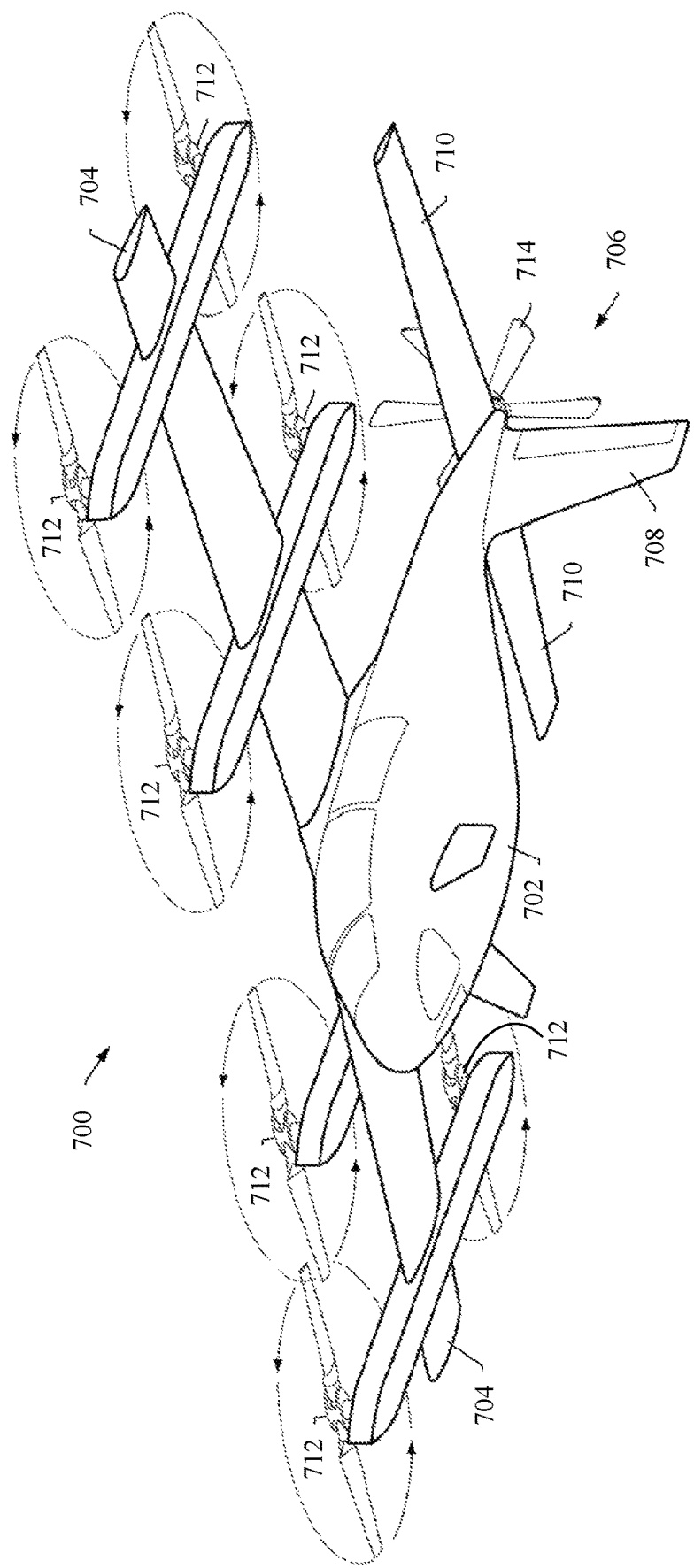
FIG. 7 is a block diagram of an example of a robot according to an example.

FIG. 7 illustrates one type of robot, namely, an Unmanned Aerial Vehicle (UAV) 700, that can benefit from example implementations of the present disclosure. As shown, the UAV 700 generally includes a fuselage 702, wings 704 extending from opposing sides of the UAV 700 in a mid-section of the fuselage 702, and an empennage or tail assembly 706 at a rear end of the fuselage 702. The tail assembly 706 includes a vertical stabilizer 708 and two horizontal stabilizers 710 extending from opposing sides of the UAV 700. Rotors 712 and 714 are mounted to respectively the wings and the end of the tail assembly 706 for lifting and propelling the UAV 700 during flight.

Further, the disclosure comprises additional examples as detailed in the following clauses below.

Clause 1. A system comprising:
at least one aircraft that navigates based at least in part on a flight path;
at least one processor; and
at least one memory coupled to the at least one processor, the at least one memory including a set of instructions, which when executed by the at least one processor, causes the system to:
segment an input flight path into a plurality of segments based on terrain data;
identify target altitude heights of endpoints of the plurality of segments based on the terrain data and a target cruise altitude;
identify a plurality of local maximas associated with the plurality of segments that are arranged in an order along the input flight path;
identify one or more local maximas of the plurality of local maximas that represent a dip in altitude from a previous one or more of the local maximas;
remove the one or more local maximas, that represent the dip, from the plurality of local maximas to generate a reduced list of local maximas;
set a plurality of waypoints as the endpoints and the local maximas in the reduced list of local maximas;
generate the flight path based at least in part on the plurality of waypoints; and
cause the flight path to be provided to the at least one aircraft.

Clause 2. The system of clause 1, wherein the instructions, when executed, cause the system to:
identify that a first waypoint of the plurality of waypoints is one of the endpoints and represents a first dip in altitude from a previous waypoint of the plurality of waypoints; and
adjust an altitude of the first waypoint to one or more of reduce or eliminate the first dip.

Clause 3. The system of clause 1, wherein the instructions, when executed, cause the system to:
execute an adjusted concave hull process on the plurality of waypoints.

Clause 4. The system of clause 1, wherein the instructions, when executed, cause the system to:
identify a first waypoint from the plurality of waypoints;
identify a plurality of possible connection points from the plurality of waypoints to connect to the first waypoint;
identify a slope between each possible connection point of the plurality of possible connection points and the first waypoint;
identify a maximum slope from the slopes that is associated with a first possible connection point of the plurality of possible connection points;
eliminate one or more second connection points of the plurality of possible connection points from the plurality of waypoints; and
bypass elimination of the first possible connection point from the plurality of waypoints.

Clause 5. The system of clause 4, wherein the instructions, when executed, cause the system to:
identify the plurality of possible connection points based on being within a minimum and maximum distance from the first waypoint.

Clause 6. The system of clause 4, wherein the instructions, when executed, cause the system to:
identify a second waypoint from the plurality of waypoints;
identify a plurality of third possible connection points from the plurality of waypoints to connect to the second waypoint; and
in response to one of the third possible connection points being one of the endpoints, automatically eliminate one or more others of the third possible connection points from the plurality of waypoints.

Clause 7. The system of any one of clauses 1 to 6, wherein the instructions, when executed, cause the system to:
adjust an altitude of one or more of the plurality of waypoints to modify a climb angle associated with the one or more of the plurality of waypoints to remain within a minimum and maximum climb angle.

Clause 8. At least one computer readable storage medium comprising a set of instructions, which when executed by a computing device, cause the computing device to:
segment an input flight path into a plurality of segments based on terrain data;
identify target altitude heights of endpoints of the plurality of segments based on the terrain data and a target cruise altitude associated with at least one aircraft;
identify a plurality of local maximas associated with the plurality of segments that are arranged in an order along the input flight path;
identify one or more local maximas of the plurality of local maximas that represent a dip in altitude from a previous one or more of the local maximas;
remove the one or more local maximas, that represent the dip, from the plurality of local maximas to generate a reduced list of local maximas;
set a plurality of waypoints as the endpoints and the local maximas in the reduced list of local maximas;
generate a flight path based at least in part on the plurality of waypoints; and
cause the flight path to be provided to the at least one aircraft.

Clause 9. The at least one computer readable storage medium of clause 8, wherein the instructions, when executed, cause the computing device to:
identify that a first waypoint of the plurality of waypoints is one of the endpoints and represents a first dip in altitude from a previous waypoint of the plurality of waypoints; and
adjust an altitude of the first waypoint to one or more of reduce or eliminate the first dip.

Clause 10. The at least one computer readable storage medium of clause 8, wherein the instructions, when executed, cause the computing device to:
execute an adjusted concave hull process on the plurality of waypoints.

Clause 11. The at least one computer readable storage medium of clause 8, wherein the instructions, when executed, cause the computing device to:
identify a first waypoint from the plurality of waypoints;
identify a plurality of possible connection points from the plurality of waypoints to connect to the first waypoint;
identify a slope between each possible connection point of the plurality of possible connection points and the first waypoint;
identify a maximum slope from the slopes that is associated with a first possible connection point of the plurality of possible connection points;

eliminate one or more second connection points of the plurality of possible connection points from the plurality of waypoints; and bypass elimination of the first possible connection point from the plurality of waypoints.

Clause 12. The at least one computer readable storage medium of clause 11, wherein the instructions, when executed, cause the computing device to:

identify the plurality of possible connection points based on being within a minimum and maximum distance from the first waypoint.

Clause 13. The at least one computer readable storage medium of clause 11, wherein the instructions, when executed, cause the computing device to:

identify a second waypoint from the plurality of waypoints;

identify a plurality of third possible connection points from the plurality of waypoints to connect to the second waypoint; and in response to one of the third possible connection points being one of the endpoints, automatically eliminate one or more others of the third possible connection points from the plurality of waypoints.

Clause 14. The at least one computer readable storage medium of any one of clauses 8 to 13, wherein the instructions, when executed, cause the computing device to:

adjust an altitude of one or more of the plurality of waypoints to modify a climb angle associated with the one or more of the plurality of waypoints to remain within a minimum and maximum climb angle.

Clause 15. A method for controlling at least one aircraft comprising:

segmenting an input flight path into a plurality of segments based on terrain data;

identifying target altitude heights of endpoints of the plurality of segments based on the terrain data and a target cruise altitude associated with the at least one aircraft;

identifying a plurality of local maximas associated with the plurality of segments that are arranged in an order along the input flight path;

identifying one or more local maximas of the plurality of local maximas that represent a dip in altitude from a previous one or more of the local maximas;

removing the one or more local maximas, that represent the dip, from the plurality of local maximas to generate a reduced list of local maximas;

setting a plurality of waypoints as the endpoints and the local maximas in the reduced list of local maximas;

generating a flight path based at least in part on the plurality of waypoints; and causing the flight path to be provided to the at least one aircraft.

Clause 16. The method of clause 15 further comprising:

identifying that a first waypoint of the plurality of waypoints is one of the endpoints and represents a first dip in altitude from a previous waypoint of the plurality of waypoints; and adjusting an altitude of the first waypoint to one or more of reduce or eliminate the first dip.

Clause 17. The method of clause 15 further comprising: executing an adjusted concave hull process on the plurality of waypoints.

Clause 18. The method of clause 15 further comprising: identifying a first waypoint from the plurality of waypoints;

identifying a plurality of possible connection points from the plurality of waypoints to connect to the first waypoint;

identifying a slope between each possible connection point of the plurality of possible connection points and the first waypoint;

identifying a maximum slope from the slopes that is associated with a first possible connection point of the plurality of possible connection points;

eliminating one or more second connection points of the plurality of possible connection points from the plurality of waypoints; and bypassing elimination of the first possible connection point from plurality of waypoints.

Clause 19. The method of clause 18, further comprising: identifying the plurality of possible connection points based on being within a minimum and maximum distance from the first waypoint.

Clause 20. The method of clause 15, further comprising: identifying a second waypoint from the plurality of waypoints;

identifying a plurality of third possible connection points from the plurality of waypoints to connect to the second waypoint; and in response to one of the third possible connection points being one of the endpoints, automatically eliminating one or more others of the third possible connection points from the plurality of waypoints.

Clause 21. The method of any one of clauses 15 to 20, further comprising:

adjusting an altitude of one or more of the plurality of waypoints to modify a climb angle associated with the one or more of the plurality of waypoints to remain within a minimum and maximum climb angle.

Examples are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some can be different, to indicate more constituent signal paths, have a number label, to indicate a number of constituent signal paths, and/or have arrows at one or more ends, to indicate primary information flow direction. This, however, should not be construed in a limiting manner. Rather, such added detail can be used in connection with one or more exemplary examples to facilitate easier understanding of a circuit. Any represented signal lines, whether or not having additional information, can actually comprise one or more signals that can travel in multiple directions and can be implemented with any suitable type of signal scheme, e.g., digital or analog lines implemented with differential pairs, optical fiber lines, and/or single-ended lines.

Example sizes/models/values/ranges can have been given, although examples are not limited to the same. As manufacturing techniques (e.g., photolithography) mature over time, it is expected that devices of smaller size could be manufactured. In addition, well known power/ground connections to IC chips and other components can or cannot be shown within the figures, for simplicity of illustration and discussion, and so as not to obscure certain aspects of the examples. Further, arrangements can be shown in block diagram form in order to avoid obscuring examples, and also in view of the fact that specifics with respect to implementation of such block diagram arrangements are highly dependent upon the computing system within which the example is to be implemented, i.e., such specifics should be well within purview of one skilled in the art. Where specific details (e.g., circuits) are set forth in order to describe example examples, it should be apparent to one skilled in the art that examples can be practiced without, or with variation of, these specific details. The description is thus to be regarded as illustrative instead of limiting.

The term "coupled" can be used herein to refer to any type of relationship, direct or indirect, between the components in question, and can apply to electrical, mechanical, fluid, optical, electromagnetic, electromechanical or other connections. In addition, the terms "first", "second", etc. can be used herein only to facilitate discussion, and carry no particular temporal or chronological significance unless otherwise indicated. To the extent that terms "includes," "including," "has," "contains," and variants thereof are used herein, such terms are intended to be inclusive in a manner similar to the term "comprises" as an open transition word without precluding any additional or other elements.

As used in this application and in the claims, a list of items joined by the term "one or more of" can mean any combination of the listed terms. For example, the phrases "one or more of A, B or C" can mean A; B; C; A and B; A and C; B and C; or A, B and C.

Those skilled in the art will appreciate from the foregoing description that the broad techniques of the examples can be implemented in a variety of forms. Therefore, while the examples have been described in connection with particular examples thereof, the true scope of the examples should not be so limited since other modifications will become apparent to the skilled practitioner upon a study of the drawings, specification, and following claims.

I claim:

1. A system comprising:
   at least one aircraft;
   at least one processor; and
   at least one memory coupled to the at least one processor, the at least one memory including a set of instructions, which when executed by the at least one processor, causes the system to:
   segment an input flight path into a plurality of segments based on terrain data;
   identify target altitude heights of endpoints of the plurality of segments based on the terrain data and a target cruise altitude;
   identify a plurality of local maximas associated with the plurality of segments that are arranged in an order along the input flight path;
   identify one or more local maximas of the plurality of local maximas that represent a dip in altitude from a previous one or more of the plurality of local maximas;
   remove the one or more local maximas, that represent the dip, from the plurality of local maximas to generate a reduced list of local maximas;
   set a plurality of waypoints as including the endpoints and the local maximas in the reduced list of local maximas;
   identify a first waypoint from the plurality of waypoints;
   identify a plurality of possible connection points from the plurality of waypoints that connect to the first waypoint, wherein the possible connection points include a first possible connection point and second possible connection points;
   identify slopes between the plurality of possible connection points and the first waypoint;
   identify a maximum slope from the slopes, wherein the maximum slope is associated with the first possible connection point;
   eliminate each of the second possible connection points from the plurality of waypoints based on the first possible connection point having the maximum slope;
   maintain the first possible connection point in the plurality of waypoints based on the first possible connection point having the maximum slope;
   generate a final flight path based at least in part on the plurality of waypoints; and
   cause the final flight path to be provided to the at least one aircraft, wherein the at least one aircraft is controlled to navigate along the final flight path.

2. The system of claim 1, wherein the instructions, when executed, cause the system to:
   identify that a second waypoint of the plurality of waypoints is one of the endpoints and represents a first dip in altitude from a previous waypoint of the plurality of waypoints; and
   adjust an altitude of the second waypoint to one or more of reduce or eliminate the first dip.

3. The system of claim 1, wherein the instructions, when executed, cause the system to:
   execute an adjusted concave hull process on the plurality of waypoints.

4. The system of claim 1, wherein the instructions, when executed, cause the system to:
   identify the plurality of possible connection points based on being within a minimum and maximum distance from the first waypoint.

5. The system of claim 1, wherein the instructions, when executed, cause the system to:
   identify a second waypoint from the plurality of waypoints;
   identify a plurality of third possible connection points from the plurality of waypoints to connect to the second waypoint; and
   in response to one of the third possible connection points being one of the endpoints, automatically eliminate one or more others of the third possible connection points from the plurality of waypoints.

6. The system of claim 1, wherein the instructions, when executed, cause the system to:
   adjust an altitude of one or more of the plurality of waypoints to modify a climb angle associated with the one or more of the plurality of waypoints to remain within a minimum and maximum climb angle.

7. At least one computer readable storage medium comprising a set of instructions, which when executed by a computing device, cause the computing device to:
   segment an input flight path into a plurality of segments based on terrain data;
   identify target altitude heights of endpoints of the plurality of segments based on the terrain data and a target cruise altitude associated with at least one aircraft;
   identify a plurality of local maximas associated with the plurality of segments that are arranged in an order along the input flight path;
   identify one or more local maximas of the plurality of local maximas that represent a dip in altitude from a previous one or more of the plurality of local maximas;
   remove the one or more local maximas, that represent the dip, from the plurality of local maximas to generate a reduced list of local maximas;
   set a plurality of waypoints as including the endpoints and the local maximas in the reduced list of local maximas;

identify a first waypoint from the plurality of waypoints;

identify a plurality of possible connection points from the plurality of waypoints that connect to the first waypoint, wherein the possible connection points include a first possible connection point and second possible connection points;

identify slopes between the plurality of possible connection points and the first waypoint;

identify a maximum slope from the slopes, wherein the maximum slope is associated with the first possible connection point;

eliminate each of the second possible connection points from the plurality of waypoints based on the first possible connection point having the maximum slope;

maintain the first possible connection point in the plurality of waypoints based on the first possible connection point having the maximum slope;

generate a final flight path based at least in part on the plurality of waypoints; and cause the final flight path to be provided to the at least one aircraft, wherein the at least one aircraft is controlled to navigate along the final flight path.

8. The at least one computer readable storage medium of claim 7, wherein the instructions, when executed, cause the computing device to:

identify that a second waypoint of the plurality of waypoints is one of the endpoints and represents a first dip in altitude from a previous waypoint of the plurality of waypoints; and adjust an altitude of the second waypoint to one or more of reduce or eliminate the first dip.

9. The at least one computer readable storage medium of claim 7, wherein the instructions, when executed, cause the computing device to:

execute an adjusted concave hull process on the plurality of waypoints.

10. The at least one computer readable storage medium of claim 7, wherein the instructions, when executed, cause the computing device to:

identify the plurality of possible connection points based on being within a minimum and maximum distance from the first waypoint.

11. The at least one computer readable storage medium of claim 7, wherein the instructions, when executed, cause the computing device to:

identify a second waypoint from the plurality of waypoints;

identify a plurality of third possible connection points from the plurality of waypoints to connect to the second waypoint; and in response to one of the third possible connection points being one of the endpoints, automatically eliminate one or more others of the third possible connection points from the plurality of waypoints.

12. The at least one computer readable storage medium of claim 7, wherein the instructions, when executed, cause the computing device to:

adjust an altitude of one or more of the plurality of waypoints to modify a climb angle associated with the one or more of the plurality of waypoints to remain within a minimum and maximum climb angle.

13. A method for controlling at least one aircraft comprising:

segmenting an input flight path into a plurality of segments based on terrain data;

identifying target altitude heights of endpoints of the plurality of segments based on the terrain data and a target cruise altitude associated with the at least one aircraft;

identifying a plurality of local maximas associated with the plurality of segments that are arranged in an order along the input flight path;

identifying one or more local maximas of the plurality of local maximas that represent a dip in altitude from a previous one or more of the plurality of local maximas;

removing the one or more local maximas, that represent the dip, from the plurality of local maximas to generate a reduced list of local maximas;

setting a plurality of waypoints as including the endpoints and the local maximas in the reduced list of local maximas;

identifying a first waypoint from the plurality of waypoints;

identifying a plurality of possible connection points from the plurality of waypoints that connect to the first waypoint, wherein the possible connection points include a first possible connection point and second possible connection points;

identifying slopes between the plurality of possible connection points and the first waypoint;

identifying a maximum slope from the slopes, wherein the maximum slope is associated with the first possible connection point;

eliminating each of the second possible connection points from the plurality of waypoints based on the first possible connection point having the maximum slope;

maintaining the first possible connection point in the plurality of waypoints based on the first possible connection point having the maximum slope;

generating a final flight path based at least in part on the plurality of waypoints; and causing the final flight path to be provided to the at least one aircraft, wherein the at least one aircraft is controlled to navigate along the final flight path.

14. The method of claim 13, further comprising:

identifying that a second waypoint of the plurality of waypoints is one of the endpoints and represents a first dip in altitude from a previous waypoint of the plurality of waypoints; and adjusting an altitude of the second waypoint to one or more of reduce or eliminate the first dip.

15. The method of claim 13, further comprising:

executing an adjusted concave hull process on the plurality of waypoints.

16. The method of claim 13, further comprising:

identifying the plurality of possible connection points based on being within a minimum and maximum distance from the first waypoint.

17. The method of claim 13, further comprising:

identifying a second waypoint from the plurality of waypoints;

identifying a plurality of third possible connection points from the plurality of waypoints to connect to the second waypoint; and in response to one of the third possible connection points being one of the endpoints, automatically eliminating one or more others of the third possible connection points from the plurality of waypoints.

18. The system of claim 1, wherein the at least one aircraft is an autonomous aircraft.

19. The at least one computer readable storage medium of claim 7, wherein the at least one aircraft is an autonomous aircraft.

20. The method of claim 13, wherein the at least one aircraft is an autonomous aircraft.

\* \* \* \* \*